United States Patent [19]
Raby

[11] Patent Number: 5,424,784
[45] Date of Patent: Jun. 13, 1995

[54] METHOD AND APPARATUS FOR CROSS FADING BETWEEN COMBED AND SIMPLE FILTERED OUTPUTS

[75] Inventor: Dean L. Raby, San Diego, Calif.

[73] Assignee: Raytheon Company, Lexington, Mass.

[21] Appl. No.: 301,217

[22] Filed: Sep. 6, 1994

[51] Int. Cl.⁶ .................................................. H04N 9/78
[52] U.S. Cl. ...................................... 348/668; 348/667
[58] Field of Search ................. 348/669, 668, 667, 666

[56] References Cited

U.S. PATENT DOCUMENTS

| | | | |
|---|---|---|---|
| 4,847,682 | 7/1989 | Tsinberg et al. | 348/668 |
| 4,954,885 | 9/1990 | Ito et al. | 348/668 |
| 5,103,296 | 4/1992 | Teichner | 348/493 X |

*Primary Examiner*—Victor R. Kostak
*Assistant Examiner*—Nathan J. Flynn
*Attorney, Agent, or Firm*—William R. Clark

[57] ABSTRACT

A decoder that provides simultaneous horizontal scanning lines for digital color video, and then band splits each line into high and low frequency signals using low pass filters and subtractors to subtract the low frequency signals from the source video. The high and low frequency signals and the source video for each line is fed to a three tap comb filter, and the high and low frequency signal inputs to the comb filter are also fed to a vertical transition detector that demodulates the high frequency signals, and then provides differences between pairs of lines for luma, chroma magnitude, and chroma phase. The difference signals are used to provide a control signal that automatically switches the comb filter from a three line weighted comb to a two line comb when large vertical transitions are detected in luma, chroma magnitude, or chroma phase. The difference signals are also used to address a programmable RAM which provides a multiplier term for the comb filter output which is then mixed with a selected one of the high and low frequency signals. Thus, the multiplier term determines the degree of cross fade between a simple filtered and a comb filtered output.

26 Claims, 5 Drawing Sheets

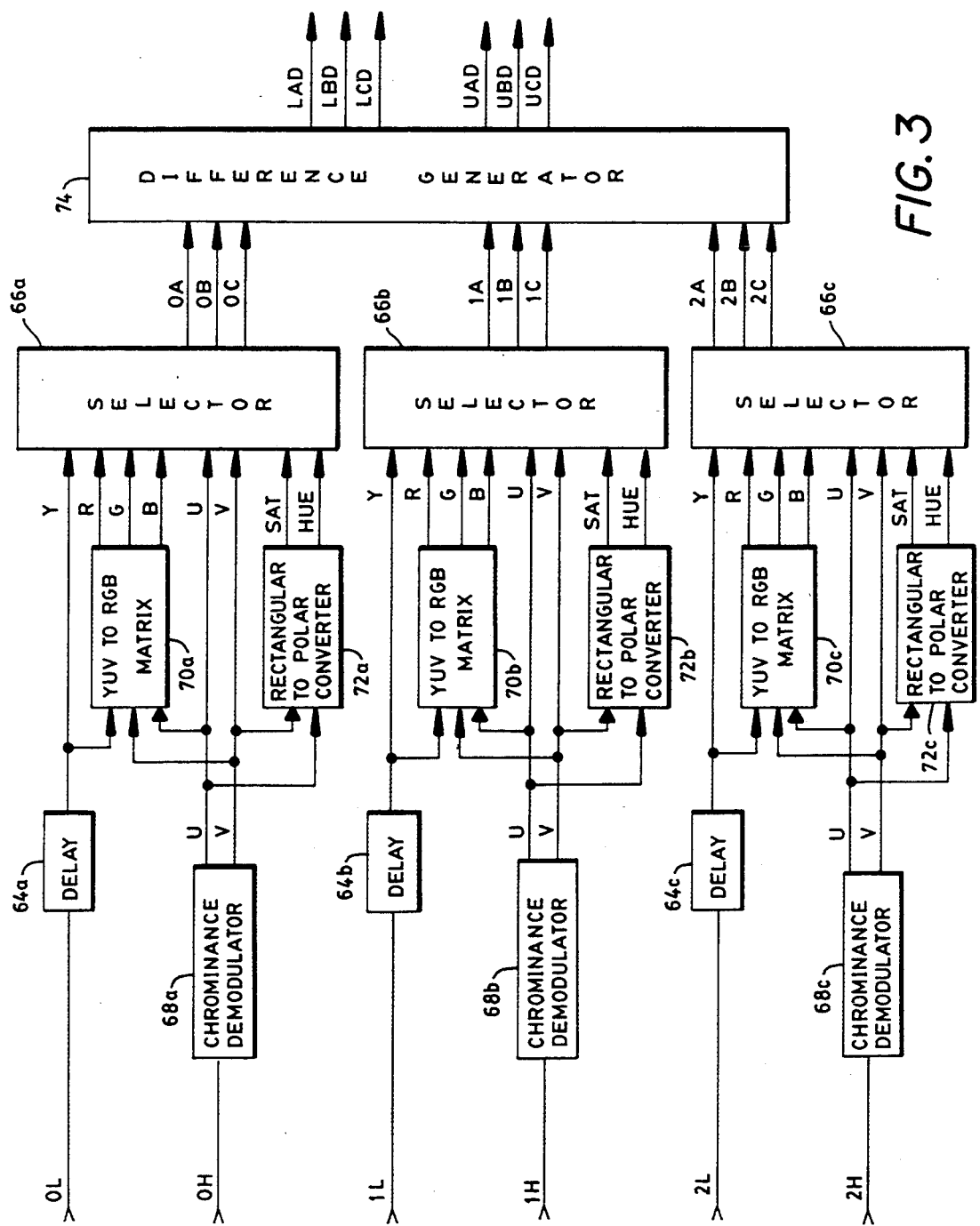

METHOD AND APPARATUS FOR CROSS FADING BETWEEN COMBED AND SIMPLE FILTERED OUTPUTS

BACKGROUND OF THE INVENTION

The present invention relates to an improved method and apparatus for separating chrominance and luminance information from a quadrature modulated video color signal. More specifically, the method and apparatus applies adaptive comb filtering techniques, as well as vertical transition detection, to a quadrature modulated video color signal to provide improved separation of chrominance and luminance signal components during aperiodic transition states.

The NTSC color television signal includes a brightness or luminance frequency (Y) signal ranging in frequency from direct current to a nominal bandwidth of 4.2 MHz, and a 3.58 MHz subcarrier which is modulated in phase and amplitude to represent hue and saturation of the image. Typically, the subcarrier is demodulated to produce color difference signals R-Y, B-Y, and G-Y, which are combined with the Y signal for reproduction of red, blue, and green signal information. As is well known, simple filters have long been used to separate the chrominance from the luminance in television receivers. In particular, the composite video is typically fed to a low pass filter to provide the luminance or luma, and to a band pass filter to provide the chrominance or chroma.

In addition to other disadvantages, simple filters have had problems in providing complete separation into chroma and luma components. For example, in order to separate the subcarrier signal for adjusting its amplitude for color intensity control or for demodulation, it is desirable to select only the subcarrier and its side bands without also including high frequency brightness components. Conversely, the full range brightness or Y signal will include the color subcarrier, even if the Y range is limited since the subcarrier modulation may extend below 3.58 MHz by over 1 MHz. Simply stated, there is some high frequency luma or cross chroma that appears in the spectrum of the chroma, and there is some high frequency chroma or cross luma that appears in the spectrum of the luma. Therefore, simple filters can not completely separate a composite video into chroma and luma. The appearance of either the Y or luma signal in the subcarrier or the subcarrier in the Y signal introduces undesirable patterns and distortion of the reproduced television image.

Comb filters have been used to separate interleaved components in a complex spectrum with minimum degradation, and therefore have certain advantages over the use of simple filters (i.e. low/high frequency or band reject filters). For example, U.S. Pat. No. 3,542,945 to N. W. Parker describes a comb filter wherein a composite video signal is subtracted from a second input that has been delayed by one horizontal scan. Since two successive lines of NTSC chroma subcarrier are 180° out of phase by reference to horizontal synchronization pulses, the chroma inputs combine as a subcarrier sum. Since lines of luminance are originally in phase, the combination of the opposite phase luminance component inputs to the subtractor result in cancellation of luminance. Thus, a comb filtered chrominance output was provided in which luminance components had been phase cancelled. Parker's circuit then subtracted the separated chrominance without further phase reversal from the composite video input signal (luminance +chrominance). Phase cancellation of chrominance then occurred which provided a separated luminance output.

Parker's combed filter technique worked well in static pictures having low chrominance levels. However, sudden color changes along a vertical axis and other dynamic changes in chrominance signals within the television picture caused highly visible aberrations and artifacts that caused deviation from the true picture. U.S. Pat. No. 4,240,105 to Faroudja describes the need to switch off the comb filtering during chroma or luma vertical transitions. In particular, Faroudja describes a combed filter that selectively separates chrominance and luminance components from a composite video signal to provide a combed chrominance output and an adaptively combed luminance output. As described, a low frequency luminance vertical transition detector is connected to an input and detects vertical amplitude transitions occurring in adjacent horizontal scanning lines to produce a first switching signal. A second transition detector detects the simultaneous occurrence of transitions in chrominance and high frequency luminance in either direction above a predetermined threshold value to provide a second switching signal. A subcarrier frequency band reject filter in the luminance path, connected to be responsive to one or both of the first and second switching signals, selects subcarrier frequency band reject luminance in lieu of combed luminance during an interval corresponding one or both of the switching signals. The system further includes a switch connected to switch to chrominance bandpass filtered video in lieu of combed chrominance during an interval of one or both of the first or second switching signals. One drawback of the above described arrangement was that the chroma transition detector relied on comparing differences in the amplitudes or magnitudes. This permitted chroma signals which were equal in magnitude but opposite in phase to fool or remain undetected by the chroma transition detector. For example, a vertical transition between cyan and magenta would go undetected.

Another disadvantage is that the simple filter separation of the chroma and luma are along two different paths. Therefore, if they are encoded or recombined for subsequent use, the resulting composite video is not an accurate reproduction of the original composite video; some frequency components have been discarded.

U.S. Pat. No. 4,050,084 to Rossi describes a typical three tap comb filter which is utilized in NTSC color televisions. As described, a typical comb filter utilizes three adjacent television lines in a given field and selectively adds and subtracts them to obtain the chrominance and luminance signals. If three sequential television lines are labeled "top" (T), "middle" (M), and "bottom" (B), a comb filter using one of the following algorithms may be used to separate chrominance (C) and luminance (Y) within the chrominance pass band.

$$C = \tfrac{1}{2}[M + \tfrac{1}{2}(T+B)] \qquad \text{Equation No. 1}$$

$$C = \tfrac{1}{2}[M + T] \qquad \text{Equation No. 2}$$

$$C = \tfrac{1}{2}[M + B] \qquad \text{Equation No. 3}$$

An examination of the function of these algorithms reveals that the comb filter effectively operates by sampling and averaging, with particular weighting coefficients, three picture elements from three adjacent lines in the case of algorithm (1), and two picture elements from two adjacent lines in the case of algorithms (2) and (3). Algorithm (1) is desirably used whenever the chrominance or the luminance on the television lines being combed are reasonably constant. However, if the television picture should contain a luminance or a chrominance transition in the vertical direction, algorithm (1) will generate a disturbing transient in the reconstructed television picture. Accordingly, there is a need for an automatic adaptive comb filter capable of detecting vertical transitions and, in response thereto, to utilize algorithm (2) or (3), or to bypass the comb filter, to minimize the transient distortion.

SUMMARY OF THE INVENTION

In accordance with the invention, a decoder for separating chroma and luma information from quadrature modulated video comprises means for simultaneously providing the video for a plurality of horizontal scanning lines and for splitting the video for each of the lines into high and low frequency signals. An adaptive comb filter is used to selectively separate chroma and luma components of the video. A vertical transition detector is responsive to the high and low frequency signals for generating a control signal in accordance with transitions of the video between the horizontal scanning lines. The decoder further comprises means responsive to the high and low frequency signals and an output of the comb filter for providing a decoder output that is substantially a cross fade between a selected one of the combed chroma or combed luma and a selected one of high and low frequency signals in accordance with the control signal.

In one preferred embodiment, the adaptive comb filter is a three tap filter that is operative to perform chroma or luma combs as selected from external control signals. In either mode of operation, appropriate high and low frequency input signals are selected to provide a combed high frequency luma output which is then coupled to a multiplier. The multiplier multiplies the comb filter output by a multiplier term which is determined in accordance with vertical transitions between the high and low signals from different pairs of horizontal scanning lines. The output of the multiplier is then added to or subtracted from a selected one of the high and low frequency signals to produce a decoder output. The multiplier term K can vary from 0 to 1. Thus, when K is 0, the comb filter output is ignored, and the decoder output is the result of a simple filtering process. In contrast, if the multiplier term K is 1, the combed high frequency luma is added to a low frequency signal if operating as a luma comb, or subtracted from a high frequency signal to cancel the high frequency luma content if operating as a chroma comb. As K takes on values between 0 and 1, a cross fade between a simple filtered output and a combed filtered output is provided. It may also be preferable to provide a programmable RAM which is responsive to vertical transitions and produces K thereby enabling the user to optimize for a particular application.

It is also preferable that a vertical transition control signal be used to automatically switch from a weighted three line comb filtering process to a two line process.

With such arrangement, vertical transitions are used to automatically control a cross fade between a simple filtered output and a comb filtered output. Thus, the decoder output is automatically adjusted or compensated for changing vertical conditions from line to line.

BRIEF DESCRIPTION OF THE DRAWINGS

The foregoing objects and advantages will be more fully understood by reading the Description of the Preferred Embodiment with reference to the drawings wherein:

FIG. 3 is a block diagram depicting an alternate approach for the vertical transition detector and control signal generator.

DESCRIPTION OF THE PREFERRED EMBODIMENTS

Figure 1:
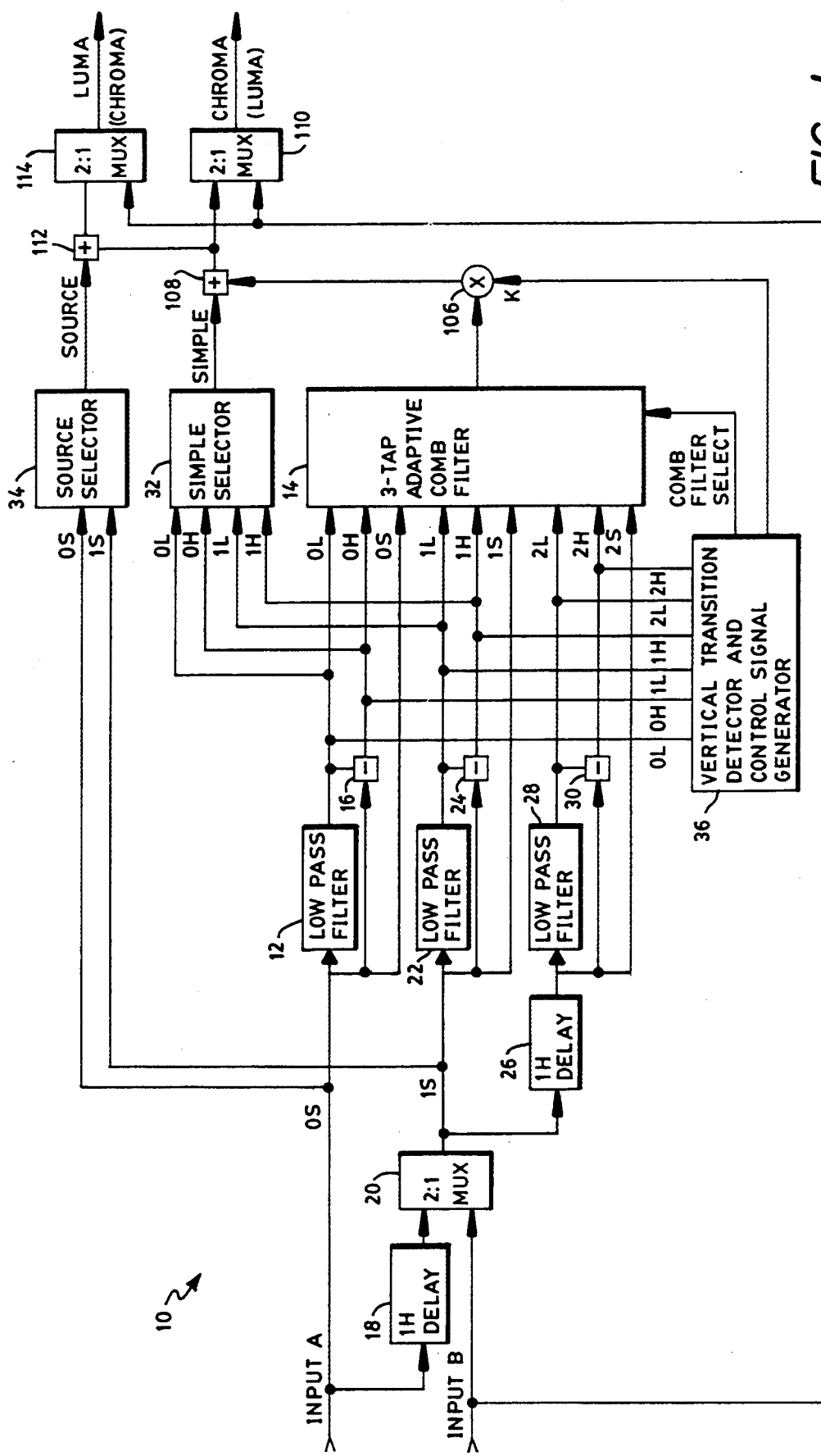
FIG. 1 is a block diagram of a decoder used to separate chroma and luma from digital video signals.

Referring to FIG. 1, adaptive comb filter decoder 10 allows the digital input of NTSC or PAL in composite or YC format, and also will receive and process D1 component video signals. The output of adaptive comb filter decoder 10 is in YC format and the chrominance can be demodulated to produce YUV. The YUV data can be weighted to give YCbCr, D1 component data, or matrixed to produce RGB data format if desired.

Referring to FIG. 1, a first case to be discussed is when input A is fed by a digital composite video such as NTSC or PAL that is a quadrature modulated color television signal. The composite video 0S is here coupled to low pass filter 12 which filters out the high frequency components (i.e. chroma and high frequency luma) to provide an 0L output. For purposes here, "0" identifies the line, "S" designates source, and the "L" designates that the signal is low frequency or luma. The 0L output from low pass filter 12 is fed to adaptive comb filter 14 and subtractor 16. This 0L signal may also include low frequency chroma or cross luma. The 0S input to low pass filter 12 is also fed to adaptive comb filter 14, and to subtractor 16. Subtractor 16 subtracts 0L from the composite or 0S signal thereby providing 0H as an output to adaptive comb filter 14. 0H is here defined as the high frequency or chroma component on line 0, and may also include high frequency luma or cross chroma. Thus, low, high, and source signals on line 0 are all fed to adaptive comb filter 14.

The composite video at input A is also fed through 1H delay 18 thereby providing composite digital video that is delayed by one line. In this example, the output of 1H delay 18 is coupled through 2:1 mux 20 and is fed to low pass filter 22. Similar to low pass filter 12, low pass filter 22 provides low frequency or luma, but here on line 1. 1L is coupled to adaptive comb filter 14. Similar to the discussion above, the input to low pass filter 22, here 1S, is also coupled directly to adaptive comb filter 14, and also to subtractor 24. 1L is subtracted from 1S in subtractor 24, thereby providing 1H as an output to adaptive comb filter 14.

Similarly, the input to low pass filter 22 is fed to 1H delay 26 thereby providing a 2S signal that is delayed by two lines from 0S. The 2S signal at the output of 1H delay 26 is fed to low pass filter 28 thereby providing a 2L signal to adaptive comb filter 14. Similar to the cases discussed above, the 2S signal is fed to subtractor 30 where 2L is subtracted thereby providing 2H to adaptive comb filter 14. In summary, in the case now being considered, a low frequency, a high frequency, and a composite source signal is fed to adaptive comb filter 14 for each of three lines, here designated 0, 1, and 2.

As shown, the 0L, 0H, 1L, and 1H signals are also fed to simple selector 32. Further, the source signals 0S and 1S are fed to source selector 34.

Adaptive comb filter 14 is controlled by vertical transition detector and control signal generator 36 which is fed by inputs to adaptive comb filter 14. More specifically, 0L, 0H, 1L, 1H, 2L, and 2H signals are fed to vertical transition detector and control signal generator 36.

Figure 2A:
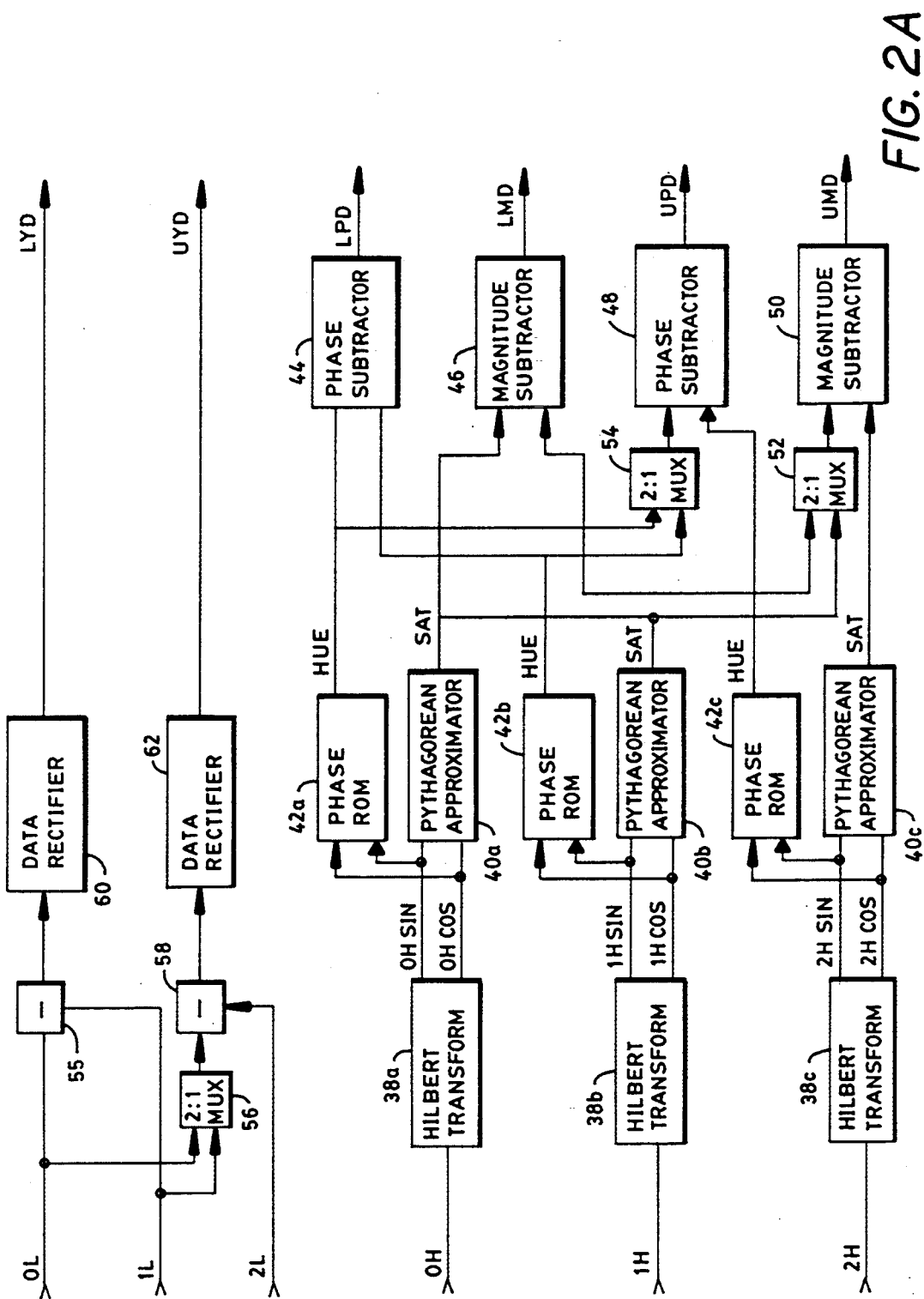
FIG. 2A is a block diagram of a first portion of the vertical transition detector and control signal generator of FIG. 1.

Referring to FIG. 2A, a portion of the vertical transition detector and control signal generator 36 is shown. The 0H signal which is the high frequency signal from line 0 is fed to Hilbert transform 38a which functions as a simple demodulator to separate the in-phase 0H SIN data and the quadrature 0H COS data which respectively correspond generally to U and V. Similarly, the 1H signal is fed to Hilbert transform 38b and 2H signal is fed to Hilbert transform 38c to provide respective 1H SIN, 1H COS, 2H SIN, and 2H COS data as shown. The sampling frequency directly effects the magnitude of the quadrature component. To overcome this, the H COS values may be multiplied by a constant depending upon the ratio of the sampling frequency to the subcarrier frequency.

The respective SIN and COS signals from respective Hilbert transforms 38a-c are fed to respective Pythagorean approximators 40a-c to provide approximations of the SATuration or chroma magnitude of the respective chrominance vectors. In its simplest form, the chrominance saturation equals the larger of the two rectified input signals added to half of the smaller one. To improve the accuracy of the result of the Pythagorean approximators 40a-c, the algorithm used in the approximation may be by the phase angle of the chroma vector. When the phase of the chroma vector is more than 11.25° away from 0, 90, 180, or 270 axes, then the larger of the two rectified signals may be added to half of the smaller to produce the saturation or chroma vector magnitude. When the phase of the chroma vector is within 11.25° of these axes, then the saturation or chroma vector magnitude may be calculated as being equal to 9/8 times the larger of the two rectified signals.

The respective SIN and COS outputs from Hilbert transforms 38a-c are also fed to respective phase ROMs 42a-c. The SIN bits of the SIN and COS inputs are used to determine the phase quadrant and the relative rectified magnitudes determine the phase angle within the quadrant in a ROM based lookup table. A 5-bit modulo two pi value having a resolution of 11.25° produces satisfactory results. Thus, the output of phase ROMs 42a-c correspond to the hue or chroma phase of the high frequency signals from respective lines 0, 1, and 2.

Generally, the function of phase subtractor 44 is to provide the phase (i.e. hue) difference between the lower two lines (0 and 1); the function of magnitude subtractor 46 is to provide the chroma magnitude (i.e. saturation) difference between the lower two lines (0 and 1); the function of phase subtractor 48 is to provide the chroma phase (i.e. hue) difference between the upper lines (1 and 2); and the function of magnitude subtractor 50 is to provide the chroma magnitude (i.e. saturation) difference between the upper two lines (1 and 2). Toward this objective, the chroma magnitude; or saturation of line 0 from Pythagorean estimator 40a is coupled to magnitude subtractor 46 and subtracted from the chroma magnitude or saturation of line 1 from Pythagorean approximator 40b in all comb filter configurations. In NTSC operations, the chroma magnitude from line 1 from Pythagorean approximator 40b is coupled through 2:1 mux 52 to magnitude subtractor 50 and subtracted from chroma magnitude on line 2 from Pythagorean approximator 40c. In PAL operation, the chroma magnitude on line 0 from Pythagorean approximator 40a is coupled through 2:1 multiplexer 52 to magnitude subtractor 50 for subtraction from the chroma magnitude on line 2 from Pythagorean approximator 40c. In both NTSC and PAL operation, the resulting sum in magnitude subtractors 46 and 50 is rectified to produce a lower magnitude difference (LMD) and upper magnitude difference (UMD) from respective magnitude subtractors 46 and 50. The lower and upper refer to the lower pair of lines (0 and 1) and the upper pair of lines (1 and 2).

The chroma phase (i.e. hue) on line 0 from phase ROM 42a is subtracted from the chroma phase on line 1 from phase ROM 42b in phase subtractor 44 for all comb filter operations. In NTSC operation, the chroma phase (i.e. hue) on line 1 from phase ROM 42a is coupled through 2:1 mux 54 to phase subtractor 48 to be subtracted from the chroma phase (i.e. hue) from line 2 from phase ROM 42c. In PAL operation, the chroma phase on line 0 from phase ROM 42a is coupled through 2:1 multiplexer 54 to phase subtractor 48 where it is subtracted from the chroma phase on line 2 from phase ROM 42c. In both NTSC and PAL operation, the resulting sum in phase subtractors 44 and 48 is rectified to produce a lower phase difference (LPD) and upper phase difference (UPD) from respective phase subtractors 44 and 48.

The chroma phase or hue difference between inputs to phase subtractors 44 and 48 must compensate for the natural 180° phase difference which appears as a two's complement change in the data. As the 180° phase difference is expected in flat areas of color, this large difference must be translated into a zero phase difference. In flat luma areas (e.g. white picture areas), the chroma magnitude is zero and therefore the chroma phase should be set to zero. However, when there is a vertical transition between luma and chroma (e.g. white and red), the phase difference between these two lines will process by the ratio of the subcarrier frequency to the pixel clock frequency. To overcome this problem, the zero chroma magnitude condition may be detected and fed as a default to control the outputs of phase subtractors 44 and 50.

Still referring to FIG. 2A, the low frequency or luma signals 0L, 1L, and 2L from respective or low pass filters 12, 22, and 28 of FIG. 1 are received by vertical transition detector and control signal generator 36. The low frequency 0L signal from line 0 is coupled to subtractor 55 and 2:1 mux 56; 1L is coupled to the subtraction input of subtractor 55 and 2:1 mux 56; and 2L is coupled to the subtraction input of subtractor 58. In NTSC operation, 2:1 mux 56 is operative to couple 1L to subtractor 58, so the respective outputs of subtractors 55 and 58 are 0L−1L and 1L−2L. In PAL operation, 2:1 mux 56 is operative to couple 0L to subtractor 58, so the respective outputs of subtractors 55 and 58 are 0L−2L and 0L−1L. In both operations, the outputs of subtractors 55 and 58 are rectified by data rectifiers 60 and 62 to provide positive output signals for lower luma difference (LYD), and upper luma difference (UYD).

Summarizing the operation of FIG. 2A, low and high frequency signals for three lines 0, 1, and 2 are processed to provide difference signals LYD, UYD, LPD, UPD, LMD, and UPD which roughly correspond to vertical transitions between upper two and lower two lines for luma, chroma phase (i.e. hue), and chroma magnitude (i.e. saturation).

FIG. 3 shows an alternate embodiment of a more general approach for the chroma processing than shown in FIG. 2A. More specifically, FIG. 2A shows processing of difference signals generally corresponding to luma Y, chroma phase or hue, and chroma magnitude or saturation. However, as shown in FIG. 3, difference signals can also be processed using RGB and YUV. Referring to FIG. 3, the 0L or luma on line 0 from low pass filter 12 is coupled to delay 64a to provide synchronism with the high frequency or chroma signals 0H. The output of delay 64a is coupled to selector 66a. The 0H signal which is high frequency or chroma from subtractor 16 of FIG. 1 is coupled to chrominance demodulator 68a to provide in conventional manner U and V signals that are also coupled to selector 66a. The U and V signals are coupled to YUV to RGB matrix 70a along with delayed 0L to provide red (R), green (G), and blue (B) which are also fed to selector 66a. Further, the U and V signals are coupled to rectangular to polar converter 72a to provide saturation or chroma magnitude and hue or chroma phase to selector 66a in a manner similar to that described with reference to FIG. 2A. Thus, selector 66a receives signals in format RGB, YUV, or Y saturation-hue.

Similarly, 1L and 1H signals are processed through corresponding delay 64b, chrominance demodulator 68b, YUV to RGB matrix 70b, and rectangular-to-polar converter 72b to provide RGB, YUV, or Y saturation-hue signals for line 1 to selector 66b. Further, 2L and 2H signals are processed through corresponding delay 64c, chrominance demodulator 68c, YUV to RGB matrix 70c, and rectangular-to-polar converter 72c to provide RGB, YUV, or Y saturation hue signals from line 2H to selector 66c. Then, selectors 66a, 66b, and 66c function to select the desired format. For example, if it was desirable to provide difference signals in RGB, R would be transferred from selector 66a to difference generator 74 on line 0A, G would be transferred on line 0B, and B would be selected on line 0C. In contrast, if difference processing was to be conducted in YUV, Y would be transferred from selector 66a to difference generator 74 on line 0A, U on line 0B, and V on line 0C. Selector 66b and 66c operate in a similar manner for lines 1 and 2. Thus, in Y saturation-hue processing, lines 0B, 0C, 1B, 1C, and 2B and 2C would correspond to the outputs of respective phase ROMs 42a–c and Pythagorean approximators 40a–c, and 0A, 1A, and 2A would correspond to 0L, 1L, and 2L of FIG. 2A. Difference generator 74 then performs the function of respective phase subtractor 44, magnitude subtractor 46, phase subtractor 48, magnitude subtractor 50, 2:1 mux 54, 2:1 mux 52, subtractors 55 and 58, 2:1 mux 56, and data rectifiers 60 and 62. As the result, the outputs of difference generator 74 for this more generalized approach are LAD, LBD, LCD, UAD, UBD, UCD, where the L and U stand for lower and upper pairs of lines, and ABC stand for the selected signals from RGB, YUV, or Y saturation-hue. As before, D stands for difference.

Figure 2B:
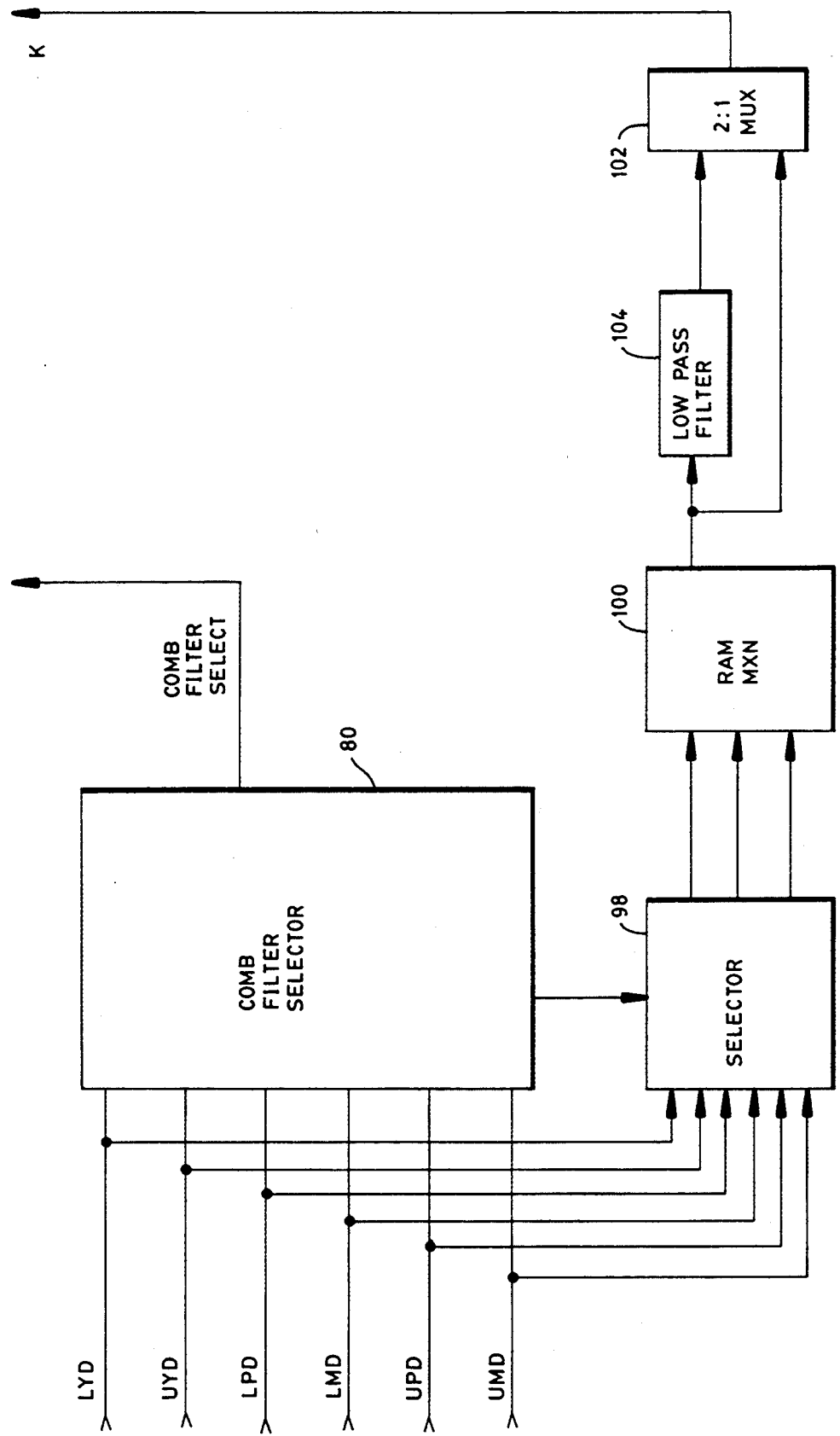
FIG. 2B is a block diagram of a second portion of the vertical transition detector and control signal generator of FIG. 1.
Figure 4:
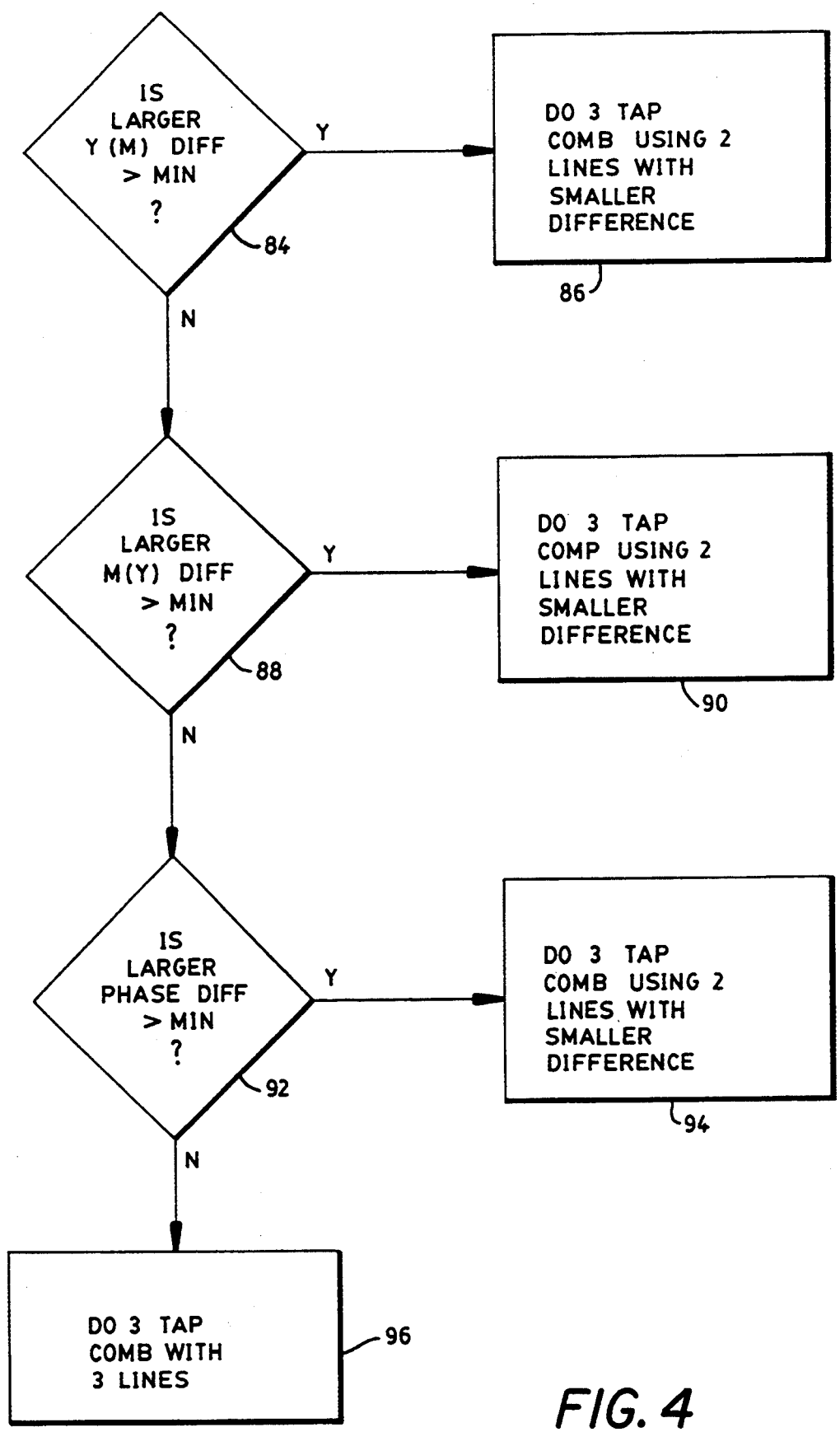
FIG. 4 is a flow diagram generally depicting the operation of the comb filter selector shown in FIG. 2B.

Referring to FIG. 2B which is a second portion of vertical transition detector and control signal generator 36, the respective lower and upper luma, chroma phase, and chroma magnitude difference signals LYD, UPD, LPD, LMD, UPD, and UMD from FIG. 2A are fed to comb filter selector 80 and to selector 98. Referring to FIG. 4, a flow diagram depicting the operation of comb filter selector 80 is shown. As shown by step 84, IS LARGER Y (M) DIFFERENCE GREATER THAN MINIMUM? Luma Y difference is processed first if comb filter 14 is operating as a luma comb filter, and chroma magnitude M is processed first if comb filter 14 is operating as a chroma comb filter. If the larger difference is greater than the set minimum, adaptive comb filter 14 is controlled to DO 3 TAP COMB USING 2 LINES WITH SMALLER DIFFERENCE. If the difference is less than the minimum, the next step IS LARGER M (Y) DIFFERENCE GREATER THAN MINIMUM? as shown by step 88. That is, if the luma difference was processed in step 84, the magnitude difference is now processed in step 88; however, if the magnitude difference was compared in block 84, the luma difference is processed in step 88. If the larger difference is greater than the minimum, the adaptive comb filter 14 is controlled to DO 3 TAP COMB USING 2 LINES WITH SMALLER DIFFERENCE as shown in step 90. If the difference of the larger of both luma Y and magnitude M are less than the minimums, the phase difference is checked in step 92. Specifically, IS LARGER PHASE DIFFERENCE GREATER THAN MINIMUM? If the difference is greater than the minimum, then the adaptive comb filter 14 is controlled to DO 3 TAP COMB USING 2 LINES WITH SMALLER DIFFERENCE as shown in step 94. If the larger of the differences for luma, magnitude, and phase are all less than the set minimums, then adaptive comb filter 14 is controlled to DO 3 TAP COMB WITH 3 LINES as shown by step 96. Therefore, in summary, adaptive comb filter 14 is only set to process three lines if the larger of the upper and lower differences for luma Y, magnitude M, and phase P are all less than set minimums. That is, all three lines 0, 1, and 2 are processed only if the vertical transitions of luma (i.e. low frequency signals) and demodulated chroma (i.e. high frequency signals demodulated into magnitude and phase) are all less than predetermined minimums. Otherwise, the adaptive comb filter 14 is controlled to operate using two lines having the smaller difference for the failed parameter: luma, magnitude, or phase.

The specific luma, magnitude and phase comparisons executed for FIG. 4 are given by the tables below:

| COMPARISON OF LUMA Y DIFFERENCE | COMB FILTER SELECTED | K SELECTION SIGNALS |
| --- | --- | --- |
| (LYD>UYD)&LYD<min) | 3 line comb | LYD,LMD,&LPD |
| (LYD=UYD)&(LYD<min) | 3 line comb | LYD,LMD,&LPD |
| (LYD=UYD)&(UYD<min) | 3 line comb | LYD,LMD,&LPD |
| (LYD<UYD)&(UYD<min) | 3 line comb | UYD,UMD,&UPD |
| (LYD>UYD)&(UYD>=min) | 2 line (1&2) | UYD,UMD,&UPD |
| (LYD>UYD)&(UYD<min) | 2 line (1&2) | UYD,UMD,&UPD |
| (LYD<UYD)&LYD>=min) | 2 line (0&1) | LYD,LMD,&LPD |
| (LYD<UYD)&(LYD<min) | 2 line (0&1) | LYD,LMD,&LPD |
| (LYD=UYD)&(LYD>=min) | luma flag 1 | ? |
| (LYD=UYD)&(LYD<min) | luma flag 2 | ? |

| COMPARISON OF MAGNITUDE M DIFFERENCE | COMB FILTER SELECTED | K SELECTION SIGNALS |
| --- | --- | --- |
| (LMD>UMD)&(LMD<min) | 3 line comb | LMD,LYD,&LPD |
| (LMD=UMD)&(LMD<min) | 3 line comb | LMD,LYD,&LPD |
| (LMD=UMD)&(UMD<min) | 3 line comb | LMD,LYD,&LPD |
| (LMD<UMD)&(UMD<min) | 3 line comb | UMD,UMD,&UPD |
| (LMD>UMD)&(UMD>=min) | 2 line (1&2) | UMD,UYD,&UPD |
| (LMD>UMD)&(UMD<min) | 2 line (1&2) | UMD,UYD,&UPD |
| (LMD<UMD)&(LMD>=min) | 2 line (0&1) | LMD,LYD,&LPD |
| (LMD<UMD)&(LMD<min) | 2 line (0&1) | LMD,LYD,&LPD |
| (LMD=UMD)&(LMD>=Min) | chroma flag 1 | ? |
| (LMD=UMD)&(LMD<min) | chroma flag 2 | ? |

| COMPARISON OF PHASE P DIFFERENCE | COMB FILTER SELECTED | K SELECTION SIGNALS |
| --- | --- | --- |
| (LPD>UPD)&(LPD<max) | 3 line comb | LPD,LMD,&LYD |
| (LPD<UPD)&(UPD<max) | 3 line comb | UPD,UMD,&UYD |
| (LPD<UPD)&(UPD=max) | 2 line (0&1) | LPD,LMD,&LYD |
| (LPD>UPD)&(LPD=max) | 2 line (1&2) | UPD,UMD,&UPD |
| (LPD=UPD)&(LPD<max) | phase flag 1 | ? |
| (LPD=UPD)&(LPD=max) | phase flag 2 | ? |
| All other cases | phase flag 3 | ? |

It is noted that the comb filter selected for the last two luma differences, the last two magnitude differences, and the last three phase differences all indicate flags to be set. These flags indicate operation of comb filter 14 under ambiguous conditions. For example, when line repetitive high frequency luma appears at the three input taps of comb filter 14 such as during a multi-burst test pattern, both the luma and chroma differences will be below the minimum threshold thereby setting luma flag 2 and chroma flag 2 while the phase difference will be maximum setting phase flag 2. In this case, the phase difference signals are forced to zero.

The above tables further have a column identified as K signals. Comb filter selector 80 controls selector 98 for each of the respective cases, to cause the selected K signals to be transferred to RAM M×N 100. As can be seen from examining the columns above, the larger of the upper or lower difference signals causing only two lines to be combed, and its corresponding Y, phase or magnitude signals, are coupled to RAM 100 and are used to determine K which, in turn, determines the mix or cross-fade between simple filtered and combed data. As will be described, the output is simple filtered when K is zero; equals combed output when K is one; and is a mix of the two when K is between 0 and 1. There may be applications where it is desirable that decoder 10 have a predominantly comb filtered output notwithstanding relatively large differences in luma magnitude or chroma magnitude or phase from line to line. Conversely, there may be applications where it is desirable to switch to a predominantly simple filtered output when relatively small differences are detected. Therefore, RAM 100 is programmable by the user to provide an optimum transfer function from the difference signals to K. The output of RAM 100 is coupled directly to 2:1 mux 102, and also to mux 102 through low pass filter 104. Low pass filter 104 changes the response time of the output of RAM 100, and may be used to avoid switching between comb and simple filtered output on a pixel by pixel basis.

Referring again to FIG. 1, adaptive comb filter 14 is a conventional three tap adaptive comb filter that operates using the principle that the chroma vector is rotated by 180° every line in the NTSC format, and every two lines in PAL format (ignoring the 25 Hz offset in PAL), while the luminance or luma component does not. For example, considering an NTSC chroma comb on high frequency video portions of three consecutive lines 0H, 1H, and 2H where 0H is the most recent, the adaptive comb filter transfer equation is:

Comb Filter Output = 0H/4 + 1H/2 + 2H/4

Because the phases of 0H and 2H are the same, and 180° out of phase with 1H, the chroma components cancel leaving only the average high frequency luma from lines 0, 1, and 2. Therefore, after appropriate weighting, if the combed high frequency luma is subtracted from 1H, combed chroma is produced. That is, the combed high frequency luma resulting from the chroma comb would be subtracted from the high frequency signal from a simple (i.e. not comb) filtering process.

As is well known to those skilled in the art, picture anomalies may result with comb filter processing when there are large vertical transitions or differences between horizontal scanning lines. As described heretofore, the vertical transition detector and control signal generator 36 detects the transitions or differences between the pairs of lines (i.e. the upper pair and the lower pair of lines). If there are large transitions between two lines, better results are generally obtained by combing only the other two lines where there may be smaller differences or transitions. Therefore, in response to a detection of appropriate conditions as defined heretofore, a comb filter select signal from vertical transition detector and control signal generator 36 causes only two lines to be combed. For example, if the lower magnitude difference (LMD) is greater than the upper magnitude difference (UMD) and the UMD is greater than or equal to a minimum threshold, the comb filter selection signal can cause adaptive comb filter 14 to only comb lines 1 and 2. For the example of a chroma comb, the transfer equation would be as follows:

Comb Filter Output = 1H + 2H

The 1H includes high frequency luma plus chroma, and the 2H includes high frequency luma plus chroma with a 180° phase difference from the 1H chroma because lines 1 and 2 are consecutive field lines here in NTSC. Therefore, when 1H and 2H are added, the chroma cancels and the sum is two times the high frequency luma. After multiplying by an appropriate factor (here ½), and subtracting the combed high frequency luma from 1H, the result would be line 1 chroma without any high frequency luma.

Heretofore, chroma combing examples have been discussed wherein the high frequency signals 0H, 1H, and 2H from lines 0, 1, and 2 are selected and processed. In addition, adaptive comb filter 14 can be externally selected by the user to function as a luma comb in a manner to be described.

Still referring to FIG. 1, the output of adaptive comb filter 14 is coupled to multiplier 106 where it is multiplied by K and fed to adder 108 which, in certain operating modes, functions as a subtractor. The other input to adder 108 is the output of simple selector 32. As shown, the inputs to simple selector 32 are 0L, 0H, 1L, and 1H from the outputs of respective low pass filters 12 and 22 and subtractors 16 and 24.

Referring to FIG. 1, the input to each tap of three tap adaptive comb filter 14 is selected from either unfiltered inputs 0S, 1S, and 2S, low frequency signals 0L, 1L, and 2L from the outputs of low pass filters 12, 22, and 28, and the high frequency signals 0H, 1H, and 2H from subtractors 16, 24, and 30, respectively. The general transfer equations from the inputs to three tap adaptive comb filter 14 to the output of adder 108 are:

Chroma = Simple − [K*Combed High Frequency Luma]

Luma = Simple + [K*Combed High Frequency Luma]

The simple term is either a low or high frequency signal 0L, 0H, 1L, or 1H on lines 0 or 1 as selected through simple selector 32. That is, simple is the output of a simple filter, here low pass filters 12 or 22, or those outputs subtracted from source video. The K term is provided to multiplier 106 by vertical transition detector and control signal generator 36 as a function of the difference between luma, chroma magnitude, and chroma phase as described heretofore. The multiplied term here is combed high frequency luma which is the output of adaptive comb filter 14. Whether operating as a chroma comb or luma comb, it can be seen that the mix between simple filtered output or comb filtered output is controlled by the instantaneous value of K. More specifically, when K is 0, the multiplied term goes to 0 thereby resulting in the output of adder 108 being equal to or totally made up of simple filtered video (i.e. 0L, 0H, 1L, or 1H). In contrast, when K is 1, combed high frequency luma is subtracted from simple in the case of chroma, and added to simple in the case of luma. That is, in the case of chroma, combed high frequency luma is subtracted from a high frequency signal (1H or 0H) thereby cancelling the high frequency luma component of the 1H or 0H resulting in a combed chroma output. In the case of luma, combed high frequency luma is added to a low frequency signal (1L or 0L) thereby providing a combed luma output which also includes the combed high frequency luma components. As K varies from 0 to 1 in accordance with the heretofore described difference signals and the user programming of RAM 100, the contribution or mix of simple and combed output varies, or is a cross fade between the two. Those of skill in the art will recognize that comb filter 14 could be configured to provide a combed chroma output in which case the transfer equations would be different.

Given below are specific transfer equations between the inputs of adaptive comb filter 14 and the output of adder 108.

| COMPOSITE OR YC, CHROMA COMB FILTERS | | |
|---|---|---|
| Standard | Transfer Equations | Comb Description |
| (1) PAL | Chroma = 1H − [(K/2)*(0H + 2H)] | 3 line |
| (2) NTSC | Chroma = 1H − [(K/2)*(1H + {(0H + 2H)/2})] | 3 line |
| (3) NTSC | Chroma = 1H − [(K/2)*(1H + 0H)] | 3 line (0&1) |
| (4) NTSC | Chroma = 1H − [(K/2)*(1H + 2H)] | 3 line (1&2) |
| (5) NTSC | Chroma = 0H − [(K/2)*(F0H + F1H)] | 2 line fields |
| (6) X | Chroma = 0H − [(K/2)*(0H + F0H)] | field |
| (7) NTSC | Chroma = 0H − [(K/2)*(FR0H + FR1H)] | 2 line frame |
| (8) X | Chroma = 0H − [(K/2)*(0H + FR0H)] | frame |

| Composite or YC, Luma Comb Filter | | |
|---|---|---|
| Standard | Transfer Equations | Comb Description |
| (9) PAL | Luma = 1L + [(K/2)*{0S + 2S − (2*1L)}] | 3 line |
| (10) NTSC | Luma = 1L + [(K/2)*{1S + ((0S + 2S)/2) − (2*1L)}] | 3 line |
| (11) NTSC | Luma = 1L + [(K/2)*{0S + 1S − (2*1L)}] | 3 line |
| (12) NTSC | Luma = 1L + [(K/2)*{1S + 2S − (2*1L)}] | 3 line (1&2) |
| (13) NTSC | Luma = 0L + [(K/2)*{0S + ((F0S − F1S)/2) − (2*0L)}] | 2 line field |
| (14) X | Luma = 0L + [(K/2)*{0S + F0S − (2*0L)}] | field |
| (15) NTSC | Luma = 0L + [(K/2)*{0S + ((FR0S − FR1S)/2) − (2*0L)}] | 2 line frame |
| (16) X | Luma = 0L + [(K/2)*{0S + FR0S − (2*0L)}] | frame |

| Y or CbCr, Component Comb Filters | | |
|---|---|---|
| Standard | Transfer Equation | Comb Description |
| (17) X | Y or CbCr = 1S + [(K/2)*{(0S + 2S)/2) − 1S}] | 3 line |
| (18) X | Y or CbCr = 1S + [(K/2)*{0S − 1S}] | 3 line (0&1) |
| (19) X | Y or CbCr = 1S + [(K/2)*{2S − 1S}] | 3 line (1&2) |
| (20) X | Y or CbCr = 1S + [(K/2)*{0S + 2S − (2*1S)}] | 3 line (0&2) |
| (21) X | Y or CbCr = 0S + [(K/2)*{F0S − F1S}] | 2 line (field) |
| (22) X | Y or CbCr = 0S + ((K/2)*{F0S − 0S}] | field |
| (23) X | Y or CbCr = 0S + [(K/2)*(FR0S − FR1S)] | frame |
| (24) X | Y or CbCr = 0S + [(K/2)*{FR0S − 0S}] | frame | where
 0H is high frequency portion of current video line
 1H is high frequency portion of video after one line delay
 2H is high frequency portion of video after two line delay 0L is low frequency portion of current video line 1L is low frequency portion of video after one line delay 2L is low frequency portion of video after two line delay 0S is current video line 1S is video after one line delay 2S is video after two line delay Fxx is Field delayed video FRxx is Frame delayed video For illustration, consider Equation (1) wherein a chroma output is provided for PAL format data. Here, adaptive comb filter 14 adds 0H and 2H which are high frequency signals with chroma and high frequency luma content from lines 0 and 2. Because the chroma on these two lines is 180° out of phase in PAL format, the chroma cancels leaving twice the average of high frequency luma. If K=1, the output of multiplier 106 is the average of high frequency luma which is then subtracted from 1H which is the high frequency signal or simple filtered signal from line 1 which includes chroma and high frequency luma. Adder 108 here functioning as a subtractor causes the combed high frequency luma to cancel the high frequency luma component of the 1H signal thereby providing an output from adder 108 that is 1H without high frequency luma. That is, the output is combed chroma. In contrast, if K=0, there is no output from multiplier 106 to subtract from 1H, so 1H including chroma and high frequency luma components is output from adder 108. Here, this output is referred to as a simple output because it is the result of a simple filtering process, here low pass filter 22 and subtractor 24. As K varies between 0 and 1, the amount of combed high frequency luma which is subtracted (or added) from the simple filter output varies. For example, if vertical transition detector and control signal generator 36 detects relatively large vertical transitions (i.e. from pairs of lines) for luma magnitude, chroma magnitude, or chroma phase, then RAM 100 would typically be programmed to provide a relatively small K to provide a relatively small amount of combed high frequency luma from multiplier 106. Thus, in this circumstance, the output of adder 108 would be predominantly simple filtered 1H because only a small percentage of the high frequency luma components would be cancelled or subtracted in adder 108. In contrast, if vertical transition detector and control signal generator 36 detects relatively small vertical transitions and provides a relatively large value (i.e. approaching 1), then a predominantly combed output is provided from adder 108. Thus, K is a control signal that provides a cross fade between a 100% simple filtered output and a 100% comb filtered output.

For illustration, now consider Equation (2) wherein NTSC format data is being chroma combed for a composite signal. Adaptive comb filter 14 selects 0H, 1H, and 2H as inputs and provides an output wherein half of the 0H and 2H signals are added to a 1H signal. Here, the chroma of adjacent lines are 180° out of phase, so the chroma components will cancel leaving two times the high frequency luma components. Assuming that K is equal to 1, ½ times twice the high frequency luma yields combed high frequency luma. In this example, 1H at the beginning of the equation is coupled through simple selector 32 to adder 108 where the high frequency luma is cancelled or subtracted from the 1H signal. Thus, the high frequency luma is cancelled or subtracted from the 1H signal leaving chroma without any high frequency luma components. Thus, the combing theoretically eliminates all cross chroma from the decoded output chroma signal from adder 108.

Considering the example where the comb filter select signal from vertical transition detector and control signal generator 36 detects that the lower magnitude difference (LMD) is less than the upper magnitude difference (UMD), and the LMD is greater than or equal to a minimum threshold value. This occurs when there are relatively large vertical transitions in chroma magnitude between both the upper and middle lines (1&2) and the lower and middle lines (0&1), but the latter difference is smaller. In such case, it is typically desirable to comb only lines 0 & 1. Therefore, the comb filter select signal from vertical transition detector and control signal generator 36 causes adaptive comb filter 14 to operate using Equation (3).

When operating as a chroma comb, the chroma output from adder 108 may be coupled through 2:1 mux 110 as a decoder output, and also to adder 112 where it is combined with the source video 0S or 1S to provide luma which may be coupled to 2:1 mux 114 as a decoder output. In contrast, when operating as a luma comb, the luma output from adder 108 may be coupled through 2:1 mux 110 as a decoder output, and also to adder 112 where it is combined with the source video 0S or 1S to provide chroma which may be coupled through 2:1 mux 114 as a decoder output.

By external selection, adaptive comb filter 14 will also operate in a luma comb mode. Referring back to the transfer equations, and in particular transfer Equation 10 for NTSC, it can be seen that the source video for lines 0 and 2 (0S and 2S) are added to provide an average of the luma and chroma, and are then added to 1S thereby cancelling the chroma and leaving the luma signal. The low frequency component from the center tap of the 3 tap adaptive comb filter 14 is subtracted to leave just the combed high frequency luma. When K=1, the output of multiplier 106 would be the combed high frequency luma which would be added to 1L from the output of simple selector 32 in adder 108. The output of adder 108 is the sum of low frequency luma and combed high frequency luma, and theoretically includes no chroma. When K=0, the output of multiplier 106 is zero, and the output of adder 108 is 1L from simple selector 32. As K is increased from 0 to 1, more of the combed high frequency luma from 3 tap adaptive comb filter 14 is added to the low frequency 1L signal from the simple selector 32 in adder 108. In cases where the high frequency signal from comb filter 14 is believed to contain cross color (i.e. when there are relatively large vertical transitions), K is typically programmed to be relatively small so the combed high frequency portion of the luma output signal is attenuated. In cases where the high frequency signal from comb filter 14 is believed to contain virtually no cross color component (i.e. small vertical transitions), K is typically programmed to be relatively large and most or all of the combed high frequency luma portion is passed through adder 108 to the luma output.

PAL operation is similar to NTSC except that there is a 180° phase shift between alternate lines rather than adjacent lines. Therefore, adding 0S and 2S from lines 0 and 2 will cancel the chroma and leave the high frequency luma to subtract or add to the simple filtered outut from simple selector 32.

For YC inputs, the luma and chroma are already separated. Therefore, rather than passing through respective low pass filters 12, 22, and 28 and subtractors 16, 24, and 30 which collectively function as band splitters into high and low frequency signals for the various lines, the Y is fed to Input A and the C is fed to Input B for a luma comb, and vice versa for a chroma comb. For YC inputs, the operation of vertical transition detector and control signal generator 36 would be modified. In the case of a luma comb, the luma source is passed through respective low pass filters 12, 22, and 28 and respective subtractors 16, 24, and 30 to provide band split high and low frequency signals which are fed to vertical transition detector and control signal generator 36. For luma combs on YC inputs, the phase differences are ignored and additional weighting is provided for the magnitude differences of the high and low frequency signals. In the case of a chroma comb, the chroma signal C bypasses band split filters 12, 22, and 28, and passes directly to the vertical transition detector and control signal generator 36. For chroma combs on YC inputs, the low frequency magnitude differences are ignored and additional weighting is given to the high frequency chroma magnitude and phase differences.

For D1 format, the data is already in the YCbCr component format. However, if the original source was composite, there is a possibility that there is luminance or luma (cross color) in the CbCr, and chrominance or chroma (cross luma) in the Y. In the first case, any luminance that was passed through a chrominance demodulator 68a-c along with the chroma to produce the base band CbCr color difference signals would now have the same characteristics as chroma. That is, the cross chroma would advance by 180° every line for NTSC, and every two lines for PAL. It is, therefore, possible to remove this cross chroma in a comb filter 14. In the latter case, any chrominance that is still in the Y can be removed in comb filter 14 as well. For D1 inputs, the operation of vertical transition detector and control signal generator 36 is once again modified. In the case of a luma comb, operation is identical to the YC input case discussed above. In the case of a chroma comb, the chroma signal bypasses band split filters 12, 22, and 28 and Hilbert transforms 38a-c, and goes directly to CbCr magnitude comparators, here identified as magnitude subtractors 46 and 50. For chroma combs on YC inputs, the luma differences are ignored and additional weighting is given to Cb and Cr magnitude comparators, here identified as magnitude subtractors 46 and 50.

Heretofore, operation of adaptive comb filter 14 has been described as a field based comb filter. Operation as a frame based comb filter or field based comb filter can also be implemented. For example, in NTSC format, the chrominance vectors advance by 180° every line; therefore, after 525 lines (one NTSC frame), the two adjacent frame lines 0 and FR0 and the two consecutive field lines FR0 and FR1 are 180° apart. The field delayed source of high frequency signal is added or subtracted to provide the combed luma to add or subtract from 0 to provide the luma or chroma output from adder 108.

In NTSC field based combing, Input A is externally delayed by 263 lines. Therefore, the two adjacent picture lines 0 and F0 and the two consecutive field lines F0 and F 1 are 180° apart. The field delayed source or high frequency can be added or subtracted to provide the combed high frequency luma to add or subtract from 0 to provide the luma or chroma at the output of adder 108.

In PAL, the chrominance vectors advance by 270° per line. Therefore, after 625 lines, the two adjacent frame lines 0 and FR0 are 90° apart. It is, therefore, necessary to delay the FR0 data internally by 1 line so that 0 and FR0 are 180° apart. The 626 line delayed source or high frequency are added and weighted to provide the combed high frequency luma to add or subtract from 0 to provide the luminance or chrominance on the comb filter output. In PAL, field based combing, the operation is identical to the frame based comb filter; but in this case, the composite video input on input A is externally delayed by 312 lines to make the chrominance on line 0 and F0 180° apart.

In summary, decoder 10 is adapted to receive NTSC or PAL digital inputs in composite or YC, and also D1 inputs. In the case of composite inputs for line based comb filtering, 1H delays 18 and 26 provide source data 1S and 2S for lines 1 and 2 which are synchronized with the current source data 0S. Source data 0S, 1S, and 2S are band split into high and low frequency signals by first passing through respective low pass filters 12, 22, and 28 to provide low frequency signals 0L, 1L, and 2L, and then subtracting these low frequency signals from the respective source signals in subtractors 16, 24, and 30 to provide high frequency signals 0H, 1H, and 2H. By band splitting in this manner rather than feeding the source signals 0S, 1S, and 2S through a simple filter such as a band pass filter to provide the high frequency signals 0H, 1H, and 2H, the sums of the respective high and low frequency signals (0H+0L; 1H+1L; and 2H+22L) accurately reproduce the source signals. That is, none of the frequency components are discarded or lost. Therefore, if the chroma and luma outputs are subsequently recombined or encoded, a more accurate video signal is produced.

The high and low frequency signals 0H, 0L, 1H, 1L, 2H, and 2L along with the original source signals 0S, 1S, and 2S are fed to adaptive comb filter 14. In addition, the actual high and low frequency signals 0L, 0H, 1L, 1H, 2L, and 2H that are inputs to the comb filter 14 are also fed to vertical transition detector and control signal generator 36. That is, the actual inputs rather than some representation thereof are used to detect vertical transitions.

Vertical transition detector and control signal generator 36 determines the low frequency differences between upper and lower pairs of lines, and also demodulates the high frequency signals to provide differences between chroma magnitude or saturation and chroma phase or hue. The chroma phase or hue differences enable detection of vertical color transitions which are equal in magnitude but opposite in phase such as cyan and magenta. If the luma, chroma magnitude, and chroma phase differences between both upper and lower pairs of lines are relatively small, a comb filter select signal from vertical transition detector and control signal generator 36 permits three tap comb filter 14 to process three lines of data with appropriate weighting. However, if large vertical transitions or differences are detected for luma, chroma magnitude or chroma phase for either pair of lines, the comb filter select signal can be used to switch adaptive comb filter 14 to process the two lines having the smaller transition difference.

Vertical transition detector and control signal generator 36 also uses the luma, chroma magnitude, and chroma phase differences to generate a K control signal which is used as a multiplier for the output of comb filter 14 in multiplier 106. More specifically, the output of multiplier 106 is added to a selected high or low frequency signal that has been simple filtered. K can range in value from 0 to 1. The transfer equations between the inputs of comb filter 14 and the output of adder 108 are such that if K is 0, the output is simple filtered data, and if K is 1, the output is comb filtered data. For values of K between 0 and 1, the output is a mix of simple filtered data and comb filtered data. The output of adder 108 is either chroma or luma depending on the selected operation of comb filter 14. The chroma or luma is then subtracted from a source signal in adder 112 to provide the opposite luma or chroma.

This concludes the description of the preferred embodiment. However, a reading of it by one of skill in the art will bring to mind many alterations and modifications that do not depart from the spirit and scope of the invention. Therefore, it is intended that the scope of the invention be limited only by the appended claims.

What is claimed is:

1. A decoder for separating chroma and luma information from quadrature modulated video, comprising:
   means for simultaneously providing said video for a plurality of horizontal scanning lines and for splitting the video for each of said lines into high and low frequency signals;
   adaptive comb filtering means for selectively separating chroma and luma components of said video to provide an output;
   vertical transition detector means responsive to said high and low frequency signals for generating a control signal in accordance with transitions of said video between said horizontal scanning lines; and
   decoder output providing means responsive to said high and low frequency signals and said comb filtering means output for providing a decoder output that is substantially a cross fade between a selected one of combed chroma or combed luma and a selected one of said high and low frequency signals in accordance with said control signal.

2. The decoder recited in claim 1 further comprising means for combining said decoder output with a selected one of said videos from said horizontal scanning lines to provide a second decoder output that is substantially a cross fade between an opposite one of said selected combed chroma or combed luma and an opposite one of said high and low frequency signals in accordance with said control signal.

3. The decoder recited in claim 1 wherein said cross fade is substantially linear.

4. The decoder recited in claim 1 wherein said video providing and splitting means comprises one line delays connected to simultaneously provide line video from three horizontal scanning lines, three low pass filters connected to receive video from a respective one of said lines to provide said low frequency signals, and three subtractors connected to receive a respective one of said low frequency signals and a respective one of said line videos to provide said high frequency signals.

5. The decoder recited in claim 1 wherein said decoder output providing means comprises a multiplier to multiply said comb filtering means output by said control signal and an adder to add an output of said multiplier with said selected one of said high or low frequency signals.

6. A decoder for separating chroma and luma information from a digital color video, comprising:
   means responsive to said video for simultaneously providing high and low frequency signals for a plurality of scanning lines;
   vertical transition detector means responsive to at least said high frequency signals for providing a multiplier term K in accordance with differences in said high frequency signals between said lines; and
   comb filter means for providing an output;
   means for multiplying said output of said comb filter means by said multiplier term K to provide a multiplied output; and
   means for combining said multiplied output with a selected one of said high or low frequency signals to provide a decoder output that substantially varies as a cross fade between the selected one of said high or low frequency signals and a selected one of combed chroma or combed luma wherein the mixture of said cross fade is a function of K.

7. A decoder for separating chroma and luma information from quadrature modulated video, comprising:
   means for simultaneously providing said video for a plurality of horizontal scanning lines and for splitting the video for each of the lines into high and low frequency signals;
   comb filter means responsive to said video and said high and low frequency signals from said plurality of horizontal scanning lines for selectively providing a combed output;
   vertical transition detector means responsive to said high and low frequency signals for providing a multiplier term K in accordance with differences of said high frequency signals from said lines and said low frequency signals from said lines;
   multiplier means for multiplying said comb filter means output by said K to provide a multiplied output; and
   means for combining a predetermined one of said high and low frequency signals and said multiplied output to provide a decoder output substantially comprising a cross fade between the selected one of the predetermined high or low frequency signals and a selected one of combed luma or combed chroma wherein the mixture of said cross fade is a function of K.

8. The decoder recited in claim 7 wherein said video providing and splitting means comprises one line delays connected to simultaneously provide video from three horizontal scanning lines, three low pass filters each connected to receive video from a respective line to provide said low frequency signals, and three subtractors each connected to receive a respective one of said low frequency signals and a respective one of the line videos to provide said high frequency signals.

9. The decoder recited in claim 7 wherein said vertical transition detector means comprises a programmable RAM look-up table for providing said multiplier term K in accordance with differences in said high and low frequency signals wherein K can vary between zero and one.

10. The decoder recited in claim 7 wherein said combining means comprises means for substantially providing said decoder output without said selected one of combed luma or combed chroma when K equals 0, and with only said selected one of combed luma or combed chroma when K equals 1.

11. The decoder recited in claim 7 further comprising means for combining said decoder output with a selected one of said line videos to provide a second decoder output.

12. A decoder for separating chroma and luma information of quadrature modulated video, comprising:
   means for delaying said quadrature modulated video through a plurality of predetermined delay periods wherein the duration of each period is related to at least one line scan to produce simultaneously video for a plurality of horizontal scanning lines;
   means for splitting the video from each of said lines into high and low frequency signals;
   means for determining differences between said high frequency signals from different lines and low frequency signals from different lines;
   a programmable RAM look-up table for providing a multiplier term K in accordance with said high and low frequency signal differences wherein K can vary between two endpoint values;
   comb filter means for adaptively comb filtering predetermined ones of said high and low frequency signals and said line videos to provide an output comprising combed high frequency luma;
   multiplier means for multiplying said comb filter means output by K to provide a multiplied output;
   adder means for combing said multiplied output with a predetermined one of said high or low frequency signals to provide a decoder output substantially comprising only said predetermined one of said high and low frequency signals if K equals one of the two endpoint values, only a selected one of combed chroma or combed luma output if K equals the other one of said endpoint values, and a mixture of said predetermined one of said high and low frequency signals and said selected one of combed chroma or combed luma output if K equals a value between said two endpoint values.

13. The decoder recited in claim 12 wherein said comb filter means comprises means responsive to said difference determining means for switching from a weighted three line comb to a two line comb.

14. The decoder recited in claim 13 where said difference determining means comprises means for comparing high and low signals differences between pairs of lines and switching to a two line comb using the two lines having a smaller difference.

15. The decoder recited in claim 12 wherein said splitting means comprises three low pass filters each connected to receive video from a respective line and provide a respective one of said low frequency signals, and three subtractors each connected to subtract a respective one of said low frequency signals from a respective one of said videos to provide said high frequency signals.

16. A decoder for separating chroma and luma information from quadrature modulated video, comprising:
   means for simultaneously providing said video for a plurality of horizontal scanning lines and for splitting the video for each of the lines into high and low frequency signals;
   means responsive to at least said high frequency signals for providing a multiplier term K in accordance with differences of said high frequency signals from different ones of said lines;
   comb filter means responsive to selected ones of said high frequency signals for providing an output substantially equal to combed high frequency luma;
   means for multiplying said comb filter means output by said K to provide a multiplied output; and
   means for subtracting said multiplied output from a selected one of said high frequency signals to provide a decoder output having substantially no combed chroma content when K=0, having substantially no high frequency luma content when K=1, and having a mixture of said combed chroma and high frequency luma in accordance with K when K has a value greater than 0 and less than 1.

17. The decoder recited in claim 16 wherein said multiplier term K means is further responsive to said low frequency signals.

18. A decoder for separating chroma and luma information from quadrature modulated video, comprising:
   means for simultaneously providing said video for a plurality of horizontal scanning lines and for splitting the video for each of the lines into high and low frequency signals;
   means responsive to at least said high frequency signals for providing a multiplier term K in accordance with differences of said high frequency signals from different ones of said lines;
   comb filter means responsive to selected video and low frequency signals from said lines for providing an output substantially equal to combed high frequency luma;
   means for multiplying said comb filter means output by said multiplier term K to provide a multiplied output; and
   means for adding said multiplied output and a selected one of said low frequency signals to provide a decoder output having substantially no combed high frequency luma content when K=0, having substantially no low frequency signal content when K=1, and having a mixture of said combed high frequency luma and low frequency signal in accordance with K when K has a value greater than 0 and less than 1.

19. A method of separating chroma and luma information from quadrature modulated video, comprising the steps of:
   simultaneously providing said video for a plurality of horizontal scanning lines;
   splitting the video for each of the lines into high and low frequency signals;
   selectively separating chroma and luma components of the video in an adaptive comb filter to provide a combed output;
   generating a control signal in accordance with vertical transitions of the video between the horizontal scanning lines; and
   providing a decoder output that is substantially a cross fade between a selected one of combed chroma or combed luma and a selected one of the high and low frequency signals in accordance with said control signal.

20. The method recited in claim 19 wherein said splitting step comprises steps of passing each of said scanning line videos through a respective low pass filter to provide said low frequency signals, and then subtracting each of said low frequency signals from its respective line video to provide said high frequency signals.

21. The method recited in claim 19 wherein said control signal generating step comprises a step of using differences of at least said high frequency signals to address a programmable RAM to provide said control signal.

22. The method recited in claim 19 further comprising a step of combining said decoder output with a selected one of the line videos to provide a second decoder output.

23. A method for separating chroma and luma information from quadrature modulated video, comprising the steps of:
- simultaneously providing the video for a plurality of horizontal scanning lines;
- splitting the video for each of the lines into high and low frequency signals;
- comb filtering selected ones of the high frequency signals to provide an output substantially equal combed high frequency luma;
- providing a multiplier term K in accordance with differences of the high frequency signals from different lines;
- multiplying the comb filter output by K to provide a multiplied output; and
- subtracting the multiplied output from a selected one of the high frequency signals to provide a decoder output having substantially high frequency luma content when K=0, having substantially no high frequency luma content when K=1, and having a mixture of the selected one of the high frequency signals and the combed high frequency luma in accordance with K when K have a value greater than 0 and less than 1.

24. The method recited in claim 23 wherein said splitting step comprises steps of passing each of said scanning line videos through a respective low pass filter to provide said low frequency signals, and then subtracting each of said low frequency signals from its respective line video to provide said high frequency signals.

25. The method recited in claim 23 wherein said multiplier term K providing step comprises a step of using differences of at least said high frequency signals to address a programmable RAM to provide said control signal.

26. The method recited in claim 23 further comprising a step of combining said decoder output with a selected one of the line videos to provide a second decoder output.

* * * * *